United States Patent
Roberts et al.

[15] 3,676,356
[45] July 11, 1972

[54] COMPOSITION FOR THE REMOVAL OF HYDROGEN SULFIDE FROM GASEOUS STREAMS

[72] Inventors: Melvin L. Roberts, Woodridge, Ill.; Carl E. Johnson, Brookhaven, Miss.; Richard C. Miller, Chicago, Ill.

[73] Assignee: Nalco Chemical Company, Chicago, Ill.

[22] Filed: March 22, 1971

[21] Appl. No.: 127,015

Related U.S. Application Data

[63] Continuation-in-part of Ser. No. 9,430, Feb. 6, 1970, Pat. No. 3,622,273.

[52] U.S. Cl. ..............................252/192, 23/2 R, 23/225 R, 23/226, 55/73, 252/438, 252/DIG. 11
[51] Int. Cl. ....................................C01b 17/04, B01d 53/34
[58] Field of Search..........................252/192, 438, DIG. 11; 23/225 R, 226, 2 R; 55/73, 244; 260/429 J

[56] References Cited

UNITED STATES PATENTS

| | | | |
|---|---|---|---|
| 1,741,113 | 12/1929 | Jacobson | 252/192 |
| 2,468,701 | 4/1949 | Cauley | 252/192 |
| 2,992,884 | 7/1961 | Bienstock et al. | 252/192 |
| 3,077,488 | 2/1963 | Mercier et al. | 23/225 R |
| 3,868,065 | 12/1962 | Hartley et al. | 23/225 R |
| 3,199,946 | 8/1965 | Fujita et al. | 252/192 |

*Primary Examiner*—Mayer Weinblatt
*Assistant Examiner*—Irwin Gluck
*Attorney*—John G. Premo, Charles W. Connors and Edward A. Ptacek

[57] ABSTRACT

A method for removing hydrogen sulfide from gaseous streams by contacting the gaseous stream with an absorbing solution of from 0.005 to 20 percent of a ferric ion complex, from 25.0 to 99.945 percent water, from 0.05 to 10.0 percent of a buffering agent, and from 0 to 74.945 percent of a water-soluble, organic solvent selected from the group consisting of dimethyl formamide and dimethyl sulfoxide.

9 Claims, No Drawings

COMPOSITION FOR THE REMOVAL OF HYDROGEN SULFIDE FROM GASEOUS STREAMS

This application is a continuation-in-part of our copending application Ser. No. 9,430, Filed Feb. 6, 1970 now U.S. Pat. No. 3,622,273.

In many industrial processes, hydrogen sulfide is given off in the waste gas. These gases often cause an air pollution problem, as well as an odor nuisance. Due to recent concern with the prevention of further air pollution, this problem has become acute. In the paper industry in particular, this is a serious problem. For instance, in Kraft paper mills, the recovery boilers which are operating under reducing conditions evolve hydrogen sulfide with the stack gases. Stack gases can contain as high as 1,000 ppm hydrogen sulfide. Since some air pollution authorities are requiring a reduction to a maximum of 70 ppm now and to a maximum of 17.5 ppm in the near future, a method of removing the hydrogen sulfide from the stack gas is necessary.

It is often necessary to remove hydrogen sulfide from many other gaseous streams for reasons other than pollution control. For instance, hydrogen sulfide should be removed from natural, industrial, and process gaseous streams. Refinery waste gases and coke oven gases contain hydrogen sulfide and it may often be necessary to remove this contaminant.

Some methods are known in the prior art for removing hydrogen sulfide. For instance, Meuly, et al, U.S. Pat. No. 3,226,320 teaches complexing iron or certain other polyvalent metals with a chelating agent such as ethylene diamine tetraacetic acid (EDTA) and contacting this complex with the gaseous stream. One of the main disadvantages of this is that the solution is not stable. If the fluid stream has a very low pH, the performance of the complex drops off appreciably.

The prior art also discloses three Czechoslovakian Pat. Nos. 117,277, 117,274, and 117,273. These references teach the removing of the hydrogen sulfide from the gas using a solution of a complex formed from nitrilotriacetic acid and ferric ion. But again, the main disadvantage is that this solution is not stable. These references even teach that the main disadvantage is the instability of the ferric ion complex. In order to overcome this instability, the references teach the use of mixtures of certain chelating agents, such as nitrilotriacetic acid and diethylene triamine pentaacetic acid. However, this was not a satisfactory solution to the problem of instability.

OBJECTS

It is an object of this invention to provide a method for removing hydrogen sulfide by using an absorbing solution that is buffered to a preferred pH range.

It is a further object of this invention to provide a method for removing hydrogen sulfide from stack gases.

Another object is the complete removal of the $H_2S$ from the gaseous stream.

It is a further object of this invention to provide a method for producing sulfur by removing $H_2S$ from a gaseous stream and converting it to a high grade of dense sulfur.

Further objects will become apparent to those skilled in the art.

THE INVENTION

Hydrogen sulfide can be removed from gaseous streams by contacting with a composition which is a solution comprising by weight:

A. from 0.005 to 20 percent of a ferric ion complex;
B. from 25.0 to 99.945 percent of water;
C. from 0.05 to 10.0 percent of a buffering agent selected from the group consisting of alkali metal carbonate and alkali metal bicarbonate.
D. from 0 to 74.945 percent of a water-soluble organic solvent selected from the group consisting of dimethyl formamide (DMF) and dimethyl sulfoxide (DMSO).

Unless otherwise indicated, all percentages are weight percent. The continuous process for removing hydrogen sulfide from gaseous streams comprises the steps of:

A. contacting the gaseous stream with a solution of from 0.005 to 20 percent by weight of a complex of nitrilotriacetic acid-ferric ion complex;
B. oxidizing the hydrogen sulfide to elemental sulfur and reducing the ferric ion complex to ferrous ion complex;
C. regenerating the ferrous ion complex by contacting with an oxidizing agent;
D. recirculating the solution of nitrilotriacetic acid-ferric ion complex; and
E. separating the elemental sulfur from the solution.

The last step is optional and the process can be practiced without separating the elemental sulfur.

In the first step, mixtures of nitrilotriacetic acid-ferric ion complex with glycolic acid-ferric ion complex and diglycolic acid-ferric ion complex could also be used. Other complexing agents such as ethylene diamine tetraacetic acid, which are known in the prior art, could also be used in this invention with the use of a buffering agent and a water-soluble, organic solvent, if necessary.

By contacting a gaseous stream with this solution, removals of $H_2S$ greater than 99 percent by weight have been achieved. The sulfur from the hydrogen sulfide is oxidized to elemental sulfur and the ferric ion is reduced to ferrous ion. The elemental sulfur can be recovered and the solution of the iron complex can be regenerated. The elemental sulfur can be recovered from the solution by filtration, centrifugation, or any other convenient method, so that it does not clog or interfere with the spray nozzles if a spraying system is used. This is also a means for preparing a high grade dense sulfur powder from a gaseous stream containing hydrogen sulfide.

The ferric ion complex can be regenerated using any oxidizing agent. For instance, ozone, peroxides, etc. could be used. Preferably, an oxygen containing gas is used. Therefore, economically, air is preferably the oxidizing agent for regeneration. For instance, the ferric ion complex can be regenerated by air blowing. An even more preferred embodiment of this invention is the use of oxygen for the regeneration which achieves more rapid regeneration. Heat could be used to speed up the regeneration in certain systems. But heat is not essential, since regeneration can take place at room temperature.

If the gaseous stream already contains an oxidizing agent, further addition of an oxidizing agent is not necessary. The regenerated complex can be recirculated to begin the process again. Thus, this can be a continuous process.

In some instances, where oxygen is not or cannot be present in the gaseous stream, regeneration must take place in a separate system. The partially or completely spent solution is transferred to the regeneration vessel. After regeneration, the solution is returned to be reused. This can also be set up as a continuous process. For instance, the complex can be pumped continuously to and from an alternate regeneration chamber. This separate container for regeneration would be needed where the hydrogen sulfide containing gas may not be exposed or mixed with air or oxygen.

The complex can act as a catalytic oxidizer of the hydrogen sulfide. The ferric ion complex is reduced to the ferrous ion complex. Regeneration is achieved by the use of heat, if desired, air, and/or oxygen. This process can be represented by the following equations:

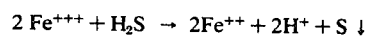

$$2\,Fe^{+++} + H_2S \rightarrow 2Fe^{++} + 2H^+ + S \downarrow$$

$$2Fe^{++} + 2H^+ + \tfrac{1}{2}O_2 \rightarrow 2Fe^{+++} + H_2O$$

PREPARATION OF THE COMPLEX

The complex is made by dissolving ferric chloride hexahydrate in water and combining this solution with an appropriate amount of the complexing agent. Ferric chloride is used to supply the ferric ion for the complex. The complexing agent is nitrilotriacetic acid, or nitrilotriacetic acid with glycolic acid, and/or diglycolic acid. It has been found that in making the solutions it is preferable to use the sodium salts of these acids. It has been found that when using the glycolic acid a molar ratio of about 3:1 based on glycolic acid to iron is used. In using the diglycolic acid, a molar ratio of about 2:1 is used, and about 1:1 molar ratio is used with nitrilotriacetic acid.

Dilute sodium hydroxide is used to raise the pH and must be added to the ferric chloride before the nitrilotriacetic acid, glycolic acid, or diglycolic acid is added. If the sodium hydroxide is added after the complexing agent, a precipitate will result. The pH is adjusted with an alkaline material because of the strong acidity of the ferric chloride. The complex is formed at a higher pH than the strongly acidic pH of the ferric chloride solution. The complex can easily be formed over a wide temperature range, with room temperature being preferred.

The complex makes up from 0.005 to 20 percent by weight of the solution. Preferably, the complex comprises from 0.01 to 5 percent by weight of the solution and even more preferred, the complex comprises from 0.01 to 1% by weight.

An example of the preparation of this complex is given below. The complex could be made much more dilute or concentrated. This example is merely illustrative.

EXAMPLE I

One hundred pounds of ferric chloride solution, 42° Be, (40 percent $FeCl_3$) was placed in a mixing container. Ten pounds of sodium hydroxide pellets were dissolved in 240 pounds of water (29 gal.) in another mixing container. The caustic solution was then slowly added to the ferric chloride solution with stirring. An additional 383.75 pounds (46 gal.) of water was added. Finally, 66.25 pounds of the trisodium salt of nitrilotriacetic acid was added at room temperature to the mixing tank and stirred until all was dissolved. This absorbing solution contains 10 percent by weight of the complex. As is often necessary, this solution can be diluted for use in this invention to make a solution even as low as 0.005 percent by weight of the complex.

THE BUFFERING AGENT

Although the complexing solution itself is very effective for removing $H_2S$, the main disadvantage is that it is not stable. This has been overcome by the use of a buffering agent. But the use of the right buffering agent is critical. It has been found that alkali metal carbonates are effective in buffering the solution. Not all buffering agents are effective. Phosphates were tried and precipitated the iron. Acetates do not work. Of the buffering agents that work, sodium carbonate was found to be the most preferred.

The buffering agent could also be potassiumcarbonate or any other carbonate of an alkali metal. Ammonium or amine salts, such as diethanol amine, could also be used.

The buffering agent can be added as a solution or as a dry powder. Naturally, if added as a dilute solution, the amount of the buffering agent needed should be calculated to fall within the ranges of this invention.

Sodium carbonate is added to the complexing solution prepared according to Example I until the pH ranges from 5 to 6.5. While the solution is being used to remove the $H_2S$ from the gaseous stream, continuous addition of sodium carbonate is maintained, if necessary. For instance, if the pH drops, additional sodium carbonate is added. The amount of the buffering agent that is initially needed can vary from 0.05 to 10 percent by weight. Preferably, it is around 1 to 5 percent by weight. The most preferred solution contains from 3 to 5 percent of the buffering agent. The amount of the buffering agent will substantially increase as the process is continued, due to the continuous addition of the buffering agent.

A very significant advantage in the use of the buffering agent and in particular the use of sodium carbonate is the increased life of the complex. Sodium carbonate allows the complex to be continuously used without the need to discard or add fresh complex. Without sodium carbonate, the complex would eventually have to be discarded and replaced. With the carbonate, this problem is essentially eliminated.

The solubility of $H_2S$ improves above pH 4.0. The performance of the complex is thus enhanced at higher pH's. The advantages of using one of these buffers is not only the stability of the complex solution but also the advantage of adjusting the pH without hampering the performance of the chelate.

WATER-SOLUBLE ORGANIC SOLVENT

It has been found that by using a water-soluble organic solvent the performance of the complexing solution is greatly enhanced. This is an optional ingredient of the solution but for appropriate reasons might be beneficial and worthwhile. The water-soluble organic solvent is selected from the group consisting of dimethyl formamide (DMF) and dimethyl sulfoxide (DMSO). The amount of the water-soluble organic solvent can vary over a wide range from less than 0.001 percent to about 75 percent. If an important consideration in removing the $H_2S$ from the gaseous stream is to produce sulfur, the use of water-soluble organic solvent, such as DMF or DMSO can offer a significant advantage. For instance, if 25 percent DMF is used in the solution a great improvement is noticed as far as the particular size of the sulfur. The particle size is increased and the sulfur is more easily removed. Using 50 percent DMF achieves even better results with larger particle size. Although the limiting factor on the amount of the water-soluble organic solvent used seems to be economics, some water is needed in the system.

In the practice of this invention, the water-soluble organic solvent can range from about 0 to about 74.945 percent. Actually, the water-soluble organic solvent could be omitted and the invention could still be practiced satisfactorily. Preferably, the solution contains from 1 to 50 percent of the water-soluble organic solvent and more preferably from 5 to 25 percent by weight.

In addition to the increased particle size of the sulfur, the water-soluble organic solvent acts to lower the surface tension of the solution and make the bubbles of the gas smaller when the gas is bubbled through the complex solution. Thus, an improvement is achieved in the gas-liquid contact and greater removal of the $H_2S$. Furthermore, DMF and DMSO are solvents for $H_2S$ and therefore, increase the contact between the complexing solution and the $H_2S$.

Another advantage in using a water-soluble organic solvent is that at high concentrations of the water-soluble organic solvent it seems to act as a buffer. But carbonate can also be used in this system.

Another advantage is that very small bubbles are produced when the gas is bubbled through the complex solution when it contains DMF or DMSO. These small bubbles produce good contact between the solution and the gas. There are other materials that would also reduce the size of the gas bubbles. But in an aqueous system, some materials often cause foaming. Using the DMF and DMSO of this invention there is substantially no foam and yet the bubble size is greatly reduced.

EXAMPLE II

The gaseous stream contained by volume 1 percent $H_2S$, 5 percent $CO_2$, and 94 percent air. This was bubbled through 400 ml of the complex solution. This solution contained 100 ppm iron chelated in a molar ratio of from 1:1 with NTA. Fifty percent of the solution was DMF and the remainder was made with water. The sulfur was of a particle size easily removed. The bubbles were very tiny, promoting good contact between the gas and the liquid.

EXAMPLE III

The same gas was used as in Example II and the same solution. Additionally, a starch-iodine solution was used to determine how much $H_2S$ was being removed. By using a known standard of iodine and recording the time needed to discolor the starch-iodine solution, the percent removal of $H_2S$ could be easily calculated. This use of the starch iodine solution is known to the art and is a standard test. Ninety-nine percent removal of $H_2S$ was achieved. DMSO could be used in place of DMF and similar results would be obtained.

Of the water-soluble organic solvents, DMF and DMSO are preferred because they are solvents for the $H_2S$, they do not precipitate the iron, they are mixable with water in all proportions, they have a high boiling point and thus make losses minimal. Another advantage is that these water-soluble organic solvents show good contact based on the surface activity, without the disadvantage of foaming.

CONTACTING THE GASEOUS STREAM

The most important step of the process is the contact step between the gaseous contaminants and the absorbing solution. Any method could be used that achieves adequate contact. Two methods that were used and provided effective contact were spray tower system and a sparging system. These methods are set forth below. Other methods could also be used. A method of contacting a liquid and a gas whereby the gas is led through a spiral path could be used. Packed towers, fixed and moveable beds and any other method which achieves adequate contact between the gaseous contaminants and the absorbing solution could be used.

SPRAY TOWER SYSTEM

One of the methods used to contact the hydrogen sulfide in the gaseous streams with the nitrilotriacetic acid-ferric ion complex is by the method of a spray tower system. An example of the spray tower system that was tried is given below.

The test equipment was of a non-corroding material, preferably 316 stainless steel. The pump delivered 40 psi at the nozzles. The spray was full cone. A filter was included to remove suspended particles such as fly ash, precipitated sulfur, etc. The absorbing solution prepared according to Example I after being diluted with 2 parts of water was sprayed in the same direction as the gas. Venturi throat sprays were also used. The following table shows the results of the tests using the nitrilotriacetic acid-ferric ion complex to remove $H_2S$.

TABLE I

Spray Tower System

| $H_2S$ In | $H_2S$ Out | % Removal | Gas flow | Total liquid flow |
|---|---|---|---|---|
| 475 ppm | 240 ppm | at least 49% | 200 cfm | 1.0 gpm |
| 365 ppm | 157 ppm | 57% | 200 cfm | 1.0 gpm |
| 475 ppm | 217 ppm | at least 54% | 130 cfm | 0.75 gpm |
| 620 ppm | 403 ppm | 35% | 130 cfm | 0.75 gpm |
| 430 ppm | 172 ppm | 60% | 130 cfm | 0.75 gpm |
| 430 ppm | 159 ppm | 63% | 130 cfm | 0.75 gpm |
| 700 ppm | 238 ppm | 66% | 130 cfm | 0.75 gpm |
| 700 ppm | 182 ppm | 74% | 130 cfm | 0.75 gpm |
| 650 ppm | 221 ppm | 66% | 130 cfm | 0.75 gpm |
| 640 ppm | 218 ppm | 66% | 130 cfm | 0.75 gpm |

As noticed by the table, the use of the nitrilotriacetic acid-ferric ion complex is effective in removing $H_2S$ in stack gases.

As previously mentioned, another method of removing sulfide was disclosed in U.S. Pat. No. 3,226,320. In this method, the polluted stream was contacted with a chelate of polyvalent metal with a substance such as ethylene diamine tetracetic acid. By way of comparison, the following table is given.

TABLE II

Spray Tower System

| Complex In | $H_2S$ | $H_2S$ Out | % Removal | Gas Flow | Total Liquid Flow |
|---|---|---|---|---|---|
| 2% EDTA-Fe | 291 | 166 | 43% | 130 cfm | 0.75 gpm |
| 2% NTA-Fe | 430 | 172 | 60% | 130 cfm | 0.75 gpm |
| 2% NTA-Fe | 700 | 238 | 66% | 130 cfm | 0.75 gpm |

As can readily be seen from the table, the nitrilotriacetic acid-ferric ion complex (NTA-Fe) is more effective in removing hydrogen sulfide than the ethylene diamine tetracetic acid-ferric ion complex (EDTA-Fe).

Concurrent scrubbing and a regeneration system can also be used with the spray tower system. In fact, if enough oxygen is present in the system, the complex will systematically be regenerated without resorting to a special regeneration system.

THE SPARGING SYSTEM

Another means of contacting the hydrogen sulfide in the gaseous streams with nitrilotriacetic acid-ferric ion complex is by the use of a sparging system. This is accomplished by bubbling the gases through a solution of the complex.

EXAMPLE IV

A nitrilotriacetic acid-ferric ion complex solution was used. The pH of the solution was 5.0. The iron concentration was 0.12 percent. The gas from the stack was pulled through the bubblers by means of an air aspirator on the exit side of the flow meter. A flow rate of approximately 1.0 cubic feet per hour was used. The gas was brought into contact with the nitrilotriacetic acid-ferric ion complex for 42 hours. Two bubblers were used. The first became very cloudy and yellow. The second was orange but started to show some haziness.

Table III shows the results of the removal of the hydrogen sulfide.

TABLE III

Sparging System

| Concentration of Complex Solution | Length of Run | $H_2S$ In | $H_2S$ Out | % Removal |
|---|---|---|---|---|
| 5% | 42 hours | 739 ppm | 1 ppm | 99.9% |
| 2% | 15 hours | 740 ppm | 1 ppm | 99.9% |
| 2% | 18 hours | 346 ppm | 4 ppm | 99.0% |

As can readily be seen, the removal exceeded 99 percent, indicating substantial success.

Next, a regeneration study was run on the solution that had been used continuously for 42 hours. Air was used to regenerate the solution by bubbling the air through the solution for one hour. The regenerated solution was then run for 12 hours. The amount of hydrogen sulfide going into the solution was 778 ppm and coming out was 8 ppm. This indicated 99 percent removal. Therefore, regenerated solution was just as effective in removing the hydrogen sulfide as the original solution.

Glycolic acid or diglycolic acid could also be used to replace part of the nitrilotriacetic acid to achieve similar results.

In summary, the present invention comprises the discovery of the improvement of using a chelating agent-ferric ion complex solution that has been stabilized by the use of a specific buffering agent to remove $H_2S$ from gaseous streams. Preferably, the solution contains a water-soluble organic solvent selected from the group consisting of DMF and DMSO.

What is claimed and desired to be protected by Letters Patent is:

1. A composition usable for removing hydrogen sulfide gas which comprises by weight:
  A. from 0.005 to 20 percent of a complex of nitrilotriacetic acid-ferric ion;
  B. from 25.0 to 99.945 percent water;

C. from 0.05 to 10.0 percent of a buffering agent selected from the group consisting of alkali metal carbonates, alkali metal bicarbonates, ammonium carbonates, ammonium bicarbonates, and amine salts; and D. from 0 to 74.945 percent of a water-soluble organic solvent selected from the group consisting of dimethyl formamide and dimethyl sulfoxide.

2. The composition of Claim 1 which comprises by weight:
A. 1 percent nitrilotriacetic acid-ferric ion complex;
B. 69 percent water;
C. 5 percent sodium carbonate; and
D. 25 percent dimethyl formamide.

3. The composition of claim 1 in which the solution is from 0.01 to 5 percent by weight of the complex.

4. The composition of claim 2 in which the solution is from 0.01 to 1 percent by weight of the complex.

5. The composition of claim 1 in which the buffering agent is from 2 to 8 percent by weight.

6. The composition of claim 5 in which the buffering agent is from 3 to 5 percent by weight.

7. The composition of claim 1 in which the water-soluble organic solvent is from 1 to 50 percent by weight.

8. The composition of claim 7 in which the water-soluble organic solvent is from 5 to 25 percent by weight.

9. The composition of claim 8 in which the water-soluble organic solvent is dimethyl formamide.

* * * * *